United States Patent
Kawanaka et al.

(10) Patent No.: US 9,166,223 B2
(45) Date of Patent: Oct. 20, 2015

(54) NEGATIVE ELECTRODE FOR LITHIUM-ION SECONDARY BATTERY AND LITHIUM-ION SECONDARY BATTERY

(71) Applicant: TDK CORPORATION, Tokyo (JP)

(72) Inventors: Yasuyuki Kawanaka, Tokyo (JP); Kazumasa Tanaka, Tokyo (JP); Yasuhiro Ikeda, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 132 days.

(21) Appl. No.: 13/845,910

(22) Filed: Mar. 18, 2013

(65) Prior Publication Data

US 2013/0260242 A1 Oct. 3, 2013

(30) Foreign Application Priority Data

Mar. 27, 2012 (JP) ................................. 2012-070945
Mar. 13, 2013 (JP) ................................. 2013-050353

(51) Int. Cl.
- *H01M 4/38* (2006.01)
- *H01M 4/64* (2006.01)
- *H01M 4/131* (2010.01)
- *H01M 4/134* (2010.01)
- *H01M 10/0525* (2010.01)
- *H01M 4/02* (2006.01)

(52) U.S. Cl.
CPC .............. *H01M 4/386* (2013.01); *H01M 4/131* (2013.01); *H01M 4/134* (2013.01); *H01M 4/64* (2013.01); *H01M 10/0525* (2013.01); *H01M 2004/021* (2013.01); *H01M 2004/027* (2013.01); *Y02E 60/122* (2013.01); *Y02T 10/7011* (2013.01)

(58) Field of Classification Search
CPC ........ H01M 4/386; H01M 4/64; H01M 4/134
USPC ........................................ 429/218.1
See application file for complete search history.

(56) References Cited

U.S. PATENT DOCUMENTS

| 7,192,673 | B1 | 3/2007 | Ikeda et al. | |
|---|---|---|---|---|
| 2007/0172733 | A1* | 7/2007 | Minami et al. | 429/218.1 |
| 2010/0075217 | A1* | 3/2010 | Yamamoto et al. | 429/152 |
| 2012/0295155 | A1* | 11/2012 | Deng et al. | 429/200 |

FOREIGN PATENT DOCUMENTS

| JP | B2-3733070 | 1/2006 |
|---|---|---|
| JP | A-2011-192563 | 9/2011 |

* cited by examiner

*Primary Examiner* — Jonathan Jelsma
(74) *Attorney, Agent, or Firm* — Oliff PLC

(57) ABSTRACT

The negative electrode for lithium-ion secondary battery is used in which a product of tensile strength and thickness of a negative electrode having a negative electrode active material layer containing silicon and silicon oxide as main components is 3.8 to 9.0 N/mm and a value obtained by dividing the product of the tensile strength and the thickness of the negative electrode by a product of tensile strength and thickness of a negative electrode current collector is 1.06 to 1.29.

2 Claims, 1 Drawing Sheet

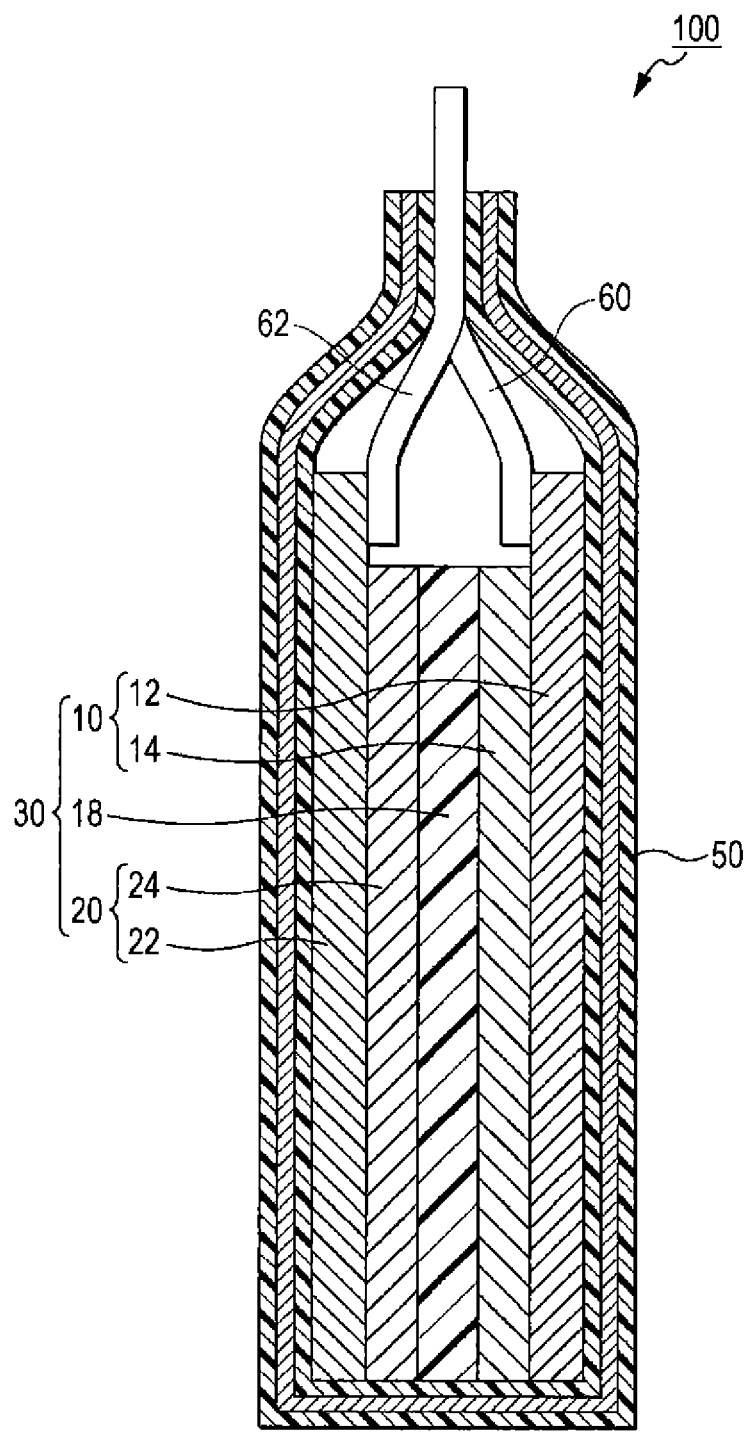

NEGATIVE ELECTRODE FOR LITHIUM-ION SECONDARY BATTERY AND LITHIUM-ION SECONDARY BATTERY

BACKGROUND OF THE INVENTION

1. Field of the Invention

The present invention relates to a negative electrode for lithium-ion secondary battery and a lithium-ion secondary battery.

2. Description of the Related Art

Since lithium-ion secondary batteries are light and have a high capacity in comparison with nickel-cadmium batteries, nickel-hydride batteries, and the like, the lithium-ion secondary batteries are widely used as power sources for portable electronic devices. In addition, the lithium-ion secondary batteries are prime candidates as power sources mounted in hybrid vehicles and electric vehicles. In recent years, along with downsizing and high functionality of portable electronic devices, the lithium-ion secondary batteries with a higher capacity, which are the power sources of these portable electronic devices, are expected.

The capacity of the lithium-ion secondary batteries mainly depends on active materials of electrodes. As for negative electrode active materials, graphite is generally used. However, a theoretical capacity of graphite is 372 mAh/g, and batteries in practical use with a capacity of about 350 mAh/g are already used. Accordingly, in order to obtain nonaqueous electrolyte secondary batteries having sufficient capacity as energy sources of high-functional portable devices in the future, there are needs for achieving a higher capacity, and negative electrode materials having larger theoretical capacity than that of graphite are needed for achieving a higher capacity.

At present, alloy-based negative electrode materials such as silicon and silicon oxide have attracted attention. Silicon can electrochemically intercalate and deintercalate lithium ions and charging and discharging with a very large amount of capacity compared with graphite are possible. In particular, it is known that the theoretical discharge capacity of silicon is about 4210 mAh/g, which is 11 times the theoretical discharge capacity of graphite.

However, when silicon and silicon oxide are used as a negative electrode active material to achieve a high capacity, several problems arise. Specifically, when lithium is intercalated, a very large amount of volume expansion is accompanied due to a change from the original crystal structure by forming a lithium-silicon alloy. For this reason, exfoliation of a negative electrode active material layer or fracture of the negative electrode occurs, and there is a problem of remarkably large cycle deterioration.

In order to solve the above problem due to the expansion, the volume expansion is suppressed by using a negative electrode current collector having high tensile strength such that a 0.2% proof stress is 250 N/mm$^2$ or more or tensile strength is 300 N/mm$^2$ or more to suppress a fracture of the negative electrode, and adhesion between the negative electrode active material layer and the negative electrode current collector are improved by using the negative electrode current collector with a surface roughness Rz of 0.6 to 10 μm by a roughening treatment (for example, Japanese Unexamined Patent Application No. 2011-192563). Moreover, the thickness of the negative electrode active material layer is limited so that the tensile strength of the negative electrode current collector is 3.82 N/mm or more, and the tensile strength of the negative electrode current collector per 1 μm thickness of an active material thin film is 1.12 N/mm or more (for example, Japanese Patent 3733070).

SUMMARY OF THE INVENTION

However, in a case in which simply the tensile strength of the negative electrode current collector is high and deformation is difficult to occur, when the silicon-based negative electrode active material is expanded or shrunk along with charging and discharging, a large amount of interface stress is generated between the negative electrode current collector and the negative electrode active material layer so that cracks or fracture is easily generated. Therefore, it is difficult to realize a lithium-ion secondary battery having a sufficient charging/discharging cycle characteristic.

The present invention is made to solve the problem in the related art, and an object of the present invention is to provide a negative electrode for lithium-ion secondary battery which suppresses exfoliation of a negative electrode active material layer along with charging and discharging, and a lithium-ion secondary battery which includes the above negative electrode and has a improved charging/discharging cycle characteristic.

In order to achieve the object, according to the present invention, there is provided a negative electrode for lithium-ion secondary battery in which a product of tensile strength and thickness of the negative electrode having a negative electrode active material layer containing silicon and silicon oxide as main components is 3.8 to 9.0 N/mm, and a value which is obtained by dividing the product of the tensile strength and the thickness of the negative electrode by a product of tensile strength and thickness of a negative electrode current collector is 1.06 to 1.29.

A charging/discharging cycle characteristic of the lithium-ion secondary battery may be improved by using the negative electrode according to the present invention.

Here, the product (N/mm) of the tensile strength and the thickness of the negative electrode is a product of tensile strength (N/mm$^2$) per cross-sectional area of the negative electrode and thickness (mm) of the negative electrode, and the product (N/mm) of the tensile strength and the thickness of the negative electrode current collector is the product of tensile strength (N/mm$^2$) per cross-sectional area of the negative electrode current collector and thickness (mm) of the negative electrode current collector. The tensile strength per cross-sectional area of the negative electrode and the negative electrode current collector can be measured in accordance with conditions in JIS Z 2241.

When the negative electrode and the negative electrode current collector are within the above range, the interface stress between the negative electrode current collector and the negative electrode active material layer along with the expansion of the negative electrode active material by charging is reduced to suppress exfoliation of the negative electrode active material layer due to elastic deformation of the negative electrode current collector.

To determine the lower limit of the product of the tensile strength and the thickness of the negative electrode is because the thickness of the negative electrode current collector is decreased so much, resistance as a negative electrode current collector is increased to lower current collecting properties, and charging/discharging rate performance at a high rate is lowered.

When the tensile strength of the negative electrode is more than the upper limit, the thickness of the negative electrode active material layer is relatively increased. When the negative electrode active material is expanded by charging, a stress difference between the negative electrode current collector of the negative electrode active material layer and the surface of the negative electrode is increased, and cracks are generated in the negative electrode active material layer to lower the charging/discharging cycle characteristic. Moreover, in a case in which the tensile strength of the negative electrode current collector is large, and deformation is difficult to occur, when the silicon-based negative electrode active material is expanded or shrunk along with charging and discharging, a large amount of interface stress is generated between the negative electrode current collector and the negative electrode active material layer, and the negative electrode active material layer is exfoliated from the current collector to lower the charging/discharging cycle characteristic.

The negative electrode active material according to the present invention has silicon and silicon oxide as main components. A negative electrode with a high capacity can be obtained by using the active material in comparison with a case in which graphite is used as a negative electrode active material. In the specification, the "negative electrode active material layer containing silicon and silicon oxide as main components" means that the mass of silicon and silicon oxide in the total mass of the negative electrode active material contained in the negative electrode active material layer is 90% by mass or more. From the viewpoint of capability of achieving larger theoretical capacity, the mass is preferably 95% by mass or more, and more preferably 100% by mass.

The present invention further provides a lithium-ion secondary battery having the negative electrode according to the present invention. The lithium-ion secondary battery has an improved charging/discharging cycle characteristic by having the negative electrode according to the present invention.

According to the present invention, it is possible to provide the negative electrode which suppresses exfoliation of the negative electrode active material layer by using the negative electrode and the negative electrode current collector having the tensile strength, and is capable of improving the charging/discharging cycle characteristic of the lithium-ion secondary battery, and the lithium-ion secondary battery using the negative electrode.

BRIEF DESCRIPTION OF THE DRAWINGS

FIGURE is a schematic cross-sectional view showing a lithium ion secondary battery according to an embodiment.

DESCRIPTION OF THE PREFERRED EMBODIMENTS

In the following, a preferred embodiment of the present invention will be described with reference to the accompanying drawings. The present invention is not limited to the following embodiment. The constituents described below include constituents which can be easily assumed by those skilled in the art and substantially the same components. Furthermore, the constituents described below can be appropriately combined.

As shown in FIGURE, a lithium-ion secondary battery 100 according to the embodiment includes a stacked body 30 having a plate-like negative electrode 20 and a plate-like positive electrode 10 arranged to oppose each other and a plate-like separator 18 adjacently arranged between the negative electrode 20 and the positive electrode 10, an electrolyte containing lithium ions, a case 50 accommodating the electrolyte and the stacked body in a sealed state, a negative electrode lead 62 in which one edge part is electrically connected to the negative electrode 20 and the other edge part is protruded outside of the case, and a positive electrode lead 60 in which one edge part is electrically connected to the positive electrode 10 and the other edge part is protruded outside of the case.

The negative electrode 20 has a negative electrode current collector 22 and a negative electrode active material layer 24 formed on the negative electrode current collector 22. In addition, the positive electrode 10 has a positive electrode current collector 12 and a positive electrode active material layer 14 formed on the positive electrode current collector 12.

The negative electrode 20 according to the embodiment is configured such that the negative electrode active material layer 24 containing a negative electrode active material is formed on one surface or both surfaces of the negative electrode current collector 22. The negative electrode active material layer 24 can be produced by applying a coating material including a negative electrode active material, a binder, a conductive auxiliary agent, and a solvent onto the negative electrode current collector 22, and removing the solvent in the coating material applied onto the negative electrode current collector 22.

Silicon and silicon oxide are main components of the negative electrode active material. As the silicon oxide, silicon monoxide (SiO), silicon dioxide ($SiO_2$), and the like can be used. These oxides may be used either singly or in combination of two kinds or more. The mass of silicon and silicon oxide in the total mass of the negative electrode active material contained in the negative electrode active material layer is 90% by mass or more. From the viewpoint of capable of achieving a larger theoretical capacity, the mass is preferably 95% by mass or more, and more preferably 100% by mass.

The binder binds the negative electrode active materials and also binds the negative electrode active material and the current collector 22. Any material may be used as the binder as long as the material can achieve the binding mentioned above. Examples of the binder for use include fluororesins such as polyvinylidene fluoride (PVDF), cellulose, styrene-butadiene rubber, polyimide resins, and polyamideimide resins.

The content of the binder in the negative electrode active material layer 24 is not limited in particular, and the content is preferably 1 to 30% by mass with respect to the sum of the mass of the negative electrode active material, the conductive auxiliary agent, and the binder, and more preferably 5 to 15% by mass.

The conductive auxiliary agent is not limited in particular as long as a conductive auxiliary agent can improve conductivity of the negative electrode active material layer 24, and well-known conductive auxiliary agents can be used.

The content of the conductive auxiliary agent in the negative electrode active material layer 24 is not limited in particular, and the content is preferably 1 to 10% by mass with respect to the sum of the mass of the negative electrode active material, the conductive auxiliary agent, and the binder when added.

Examples of the solvent for use include N-methyl-2-pyrrolidone and N,N-dimethylformamide.

The negative electrode current collector 22 is preferably a thin conductive plate material, and a metal foil having a thickness of 8 to 30 μm is preferable. The negative electrode current collector 22 is preferably formed from a material that does not form an alloy with lithium, and a particularly preferable material is copper. A copper foil of which the surface is roughened is preferable. An example of the copper foil includes an electrolytic copper foil. The electrolytic copper foil is a copper foil obtained by, for example, immersing a metal drum in an electrolyte that dissolves copper ions, applying a current while rotating the drum followed by deposition of copper on the surface of the drum and exfoliating the deposit.

In addition, a pressed copper foil produced by pressing a cast copper ingot into a desired thickness may be used, and a copper foil in which copper is deposited on the surface of the pressed copper foil by electrolysis and the surface is roughened may be used.

A coating method is not limited in particular, and methods that are typically employed in producing an electrode can be used. For example, a slit die coating method and a doctor blade method can be used.

A method for removing the solvent in the coating material applied onto the negative electrode current collector 22 is not limited in particular, and the negative electrode current collector 22 in which the coating material is applied may be dried, for example, at 80° C. to 150° C.

For example, the negative electrode 20 in which the negative electrode active material layer 24 is formed in this manner may be optionally subjected to a pressing process by a roll press apparatus. The line pressure of a roll press can be 50 to 7000 kgf/cm.

By the pressing process, working hardening is introduced into the negative electrode current collector 22 and the tensile strength can be improved.

It is preferable that the negative electrode 20 according to the embodiment have the product of the tensile strength and the thickness of the negative electrode 20 of 3.8 to 9.0 N/mm, and a value, obtained by dividing the product of the tensile strength and the thickness of the negative electrode 20 by the product of the tensile strength and the thickness of the negative electrode current collector 22, of 1.06 to 1.29. Due to this, the exfoliation of the negative electrode current collector 22 and the negative electrode active material layer 24 is suppressed, and the charging/discharging cycle characteristic of the lithium-ion secondary battery 100 is easily and remarkably increased. The charging/discharging cycle characteristic of the lithium-ion secondary battery 100 preferably has capacity retention of 50% or more after 500 cycles, and particularly preferably 55% or more. In order for the product of the tensile strength and the thickness of the negative electrode and the value obtained by dividing the product of the tensile strength and the thickness of the negative electrode by the product of the tensile strength and the thickness of the negative electrode current collector to fall in a desired range, the production conditions, such as a line pressure of the pressing process, an application amount of the negative electrode active material, an application amount of the positive electrode active material and the thickness of the negative electrode current collector, can be appropriately adjusted.

The negative electrode 20 having good adhesive properties can be prepared through the above step of preparing the negative electrode.

Examples of the positive electrode active material include oxides and sulfides that allow intercalation and deintercalation of lithium ions, and the oxides and sulfides may be used either singly or in combination of two kinds or more. Specific examples thereof include lithium-free metal oxides and metal sulfides and lithium composite oxides containing lithium. Well-known materials can be used as the positive electrode current collector 12, the binder and the conductive auxiliary agent, and the positive electrode active material layer 14 is formed on the positive electrode current collector 12 to produce the positive electrode 10 through the step illustrated above in the step of producing the negative electrode.

The separator 18 is not limited in particular as long as a material is stable with respect to the electrolyte, and has excellent liquid retaining properties, and example thereof generally includes porous polyolefin sheets such as polyethylene and polyolefin, and nonwoven fabrics.

Examples of the electrolyte for use include aprotic solvents with high dielectric constants such as ethylene carbonate and propylene carbonate, and aprotic solvents with low viscosity such as dimethyl carbonate, and ethyl methyl carbonate can be used as a solvent. Examples of an electrolyte include lithium salts such as $LiBF_4$, $LiPF_6$, and $LiClO_4$.

The case 50 is not limited in particular as long as a material can inhibit the electrolyte from leaking out therefrom and moisture and the like from invading the lithium-ion secondary battery 100 from the outside.

The leads 60 and 62 are formed from a conductive material such as aluminum.

The preferred embodiment of the present invention has been described above, and the present invention is not limited to the embodiment. For example, the lithium-ion secondary battery is not limited to the shape shown in FIGURE, and may be coin type in which electrodes and a separator, all punched into a coin shape, are stacked, or a cylinder type in which electrode sheets and a separator are spirally wound.

The prepared negative electrode and lithium-ion secondary battery were evaluated by the following method.

Evaluation of Tensile Strength

The tensile strength of the used negative electrode current collectors and the prepared negative electrodes in Examples was evaluated in accordance with the conditions in JIS Z 2241 using a tensile tester. The negative electrode current collectors used in the evaluation were subjected to a pressing process and a heating process as in each Example. An average value of the product of the tensile strength ($N/mm^2$) of the negative electrodes and the thickness (mm) of the negative electrodes, and an average value of the product of the tensile strength ($N/mm^2$) of the negative electrode current collectors and the thickness (mm) of the negative electrode current collectors were respectively set as products of tensile strength and thickness, and the evaluation was performed.

Measurement of Charging/Discharging Cycle Characteristic

When a voltage range is 2.5 V to 4.2 V, and 1C=1600 mAh/g, each battery was charged at a current value of 0.5 C, and each battery was discharged at a current value of 1.0 C to evaluate the charging/discharging cycle characteristic using a secondary battery charging and discharging tester. Here, when discharge capacity of the first cycle was set as an initial discharge capacity, the capacity retention (%) is the ratio (%) of the discharge capacity (100×(discharge capacity of each cycle/initial discharge capacity)) in the number of each cycle with respect to the initial discharge capacity. The higher the capacity retention is, the better the charging/discharging cycle characteristic is.

Measurement of Charging/Discharging Rate Performance

When a voltage range is 2.5 V to 4.2 V, and 1C=1600 mAh/g, each battery was charged at a current value of 0.5 C, and each battery was discharged at current values of 0.5 C and 5.0 C to evaluate the charging/discharging rate performance using a secondary battery charging/discharging tester. Here, the capacity retention (%) is the ratio (%) of 5.0 C discharge capacity with respect to the 0.5 C discharge capacity (100× (5.0 C discharge capacity/0.5 C discharge capacity). The higher the capacity retention is, the better the charging/discharging rate performance is.

EXAMPLES

Example 1

Preparation of Negative Electrode

As for the negative electrode active material, Si and SiO were mixed at a ratio of Si/Sio=1/2 (weight ratio), and were crushed and mixed by a planetary ball mill to be used. Alumina beads having a diameter of 3 mm were used as media of the planetary ball mill, the number of rotation was 500 rmp, and crushing and mixing time was 60 min.

As for the negative electrode active material, 77 parts by mass of the mixture of Si and SiO, 3 parts by mass of acetylene black as a conductive auxiliary agent, and 20 parts by mass of polyamidimide as a binder were mixed to form a negative electrode mixture. Subsequently, the negative electrode mixture was dissolved in N-methyl-2-pyrrolidone to form a paste negative-electrode mixture coating material. The coating material was applied onto both surfaces of an electrolytic copper foil having a thickness of 10 μm so that the application amount of the negative electrode active material was 3.3 mg/cm$^2$, and dried at 100° C. to form a negative electrode active material layer. Then, the negative electrode active material layer was subjected to a pressing process by a roller press at a line pressure of 2000 kgf/cm, and a heating process at 270 to 350° C. for 1 to 3 hours in vacuum to prepare a negative electrode having a thickness of 67 μm.

Preparation of Positive Electrode

As for the positive electrode active material, 90 parts by mass of $LiNi_{0.85}Co_{0.10}Al_{0.05}O_2$, 5 parts by mass of acetylene black as a conductive auxiliary agent, and 5 parts by mass of polyvinylidene fluoride as a binder were mixed to form a positive electrode mixture. Subsequently, the positive electrode mixture was dissolved in N-methyl-2-pyrrolidone to form a paste positive-electrode mixture coating material. The coating material was applied onto both surfaces of an aluminum foil having a thickness of 20 so that the application amount of the positive electrode active material was 20.4 mg/cm$^2$, and dried at 100° C. to form a positive electrode active material layer. Then, the positive electrode active material layer was subjected to a pressing process by a roller press to prepare a positive electrode having a thickness of 132 μm.

Preparation of Evaluation Lithium-Ion Secondary Battery

The negative electrode and the positive electrode prepared above were put into an aluminum laminated pack with the separator made of a porous polyethylene film interposed therebetween and a $LiPF_6$ solution (solvent: EC/DEC=3/7 (volume ratio)) with a density of 1M was injected in the aluminum laminated pack as an electrolyte and was sealed in vacuum to prepare an evaluation lithium-ion secondary battery.

Examples 2 to 4

Negative electrodes of Examples 2 to 4 were obtained as in Example 1 except that pressing process conditions were respectively changed as shown in Table 1. In addition, evaluation lithium-ion secondary batteries of Examples 2 to 4 were prepared as in Example 1 using the obtained negative electrodes.

Examples 5 to 9

Negative electrodes of Examples 5 to 9 were obtained as in Example 1 except that the negative electrode active material and the positive electrode active material were applied so that the application amount of the negative electrode active material was 2.2 mg/cm$^2$, and the application amount of the positive electrode active material was 13.6 mg/cm$^2$, an electrolytic copper foil having a thickness of 26 μm was used as a negative electrode current collector, and pressing process conditions were respectively changed as shown in Table 1. In addition, evaluation lithium-ion secondary batteries of Examples 5 to 9 were prepared as in Example 1 using the obtained negative electrodes.

Examples 10 to 12

Negative electrodes of Examples 10 to 12 were obtained as in Example 1 except that a pressed copper alloy foil having a thickness of 10 μm was used as a negative electrode current collector, and pressing process conditions were respectively changed as shown in Table 1. In addition, evaluation lithium-ion secondary batteries of Examples 10 to 12 were prepared as in Example 1 using the obtained negative electrodes.

Examples 13 to 15

Negative electrodes of Examples 13 to 15 were obtained as in Example 1 except that the negative electrode active material and the positive electrode active material were applied so that the application amount of the negative electrode active material was 2.2 mg/cm$^2$, and the application amount of the positive electrode active material was 13.6 mg/cm$^2$, a pressed copper alloy foil having a thickness of 12 μm was used as a negative electrode current collector, and pressing process conditions were respectively changed as shown in Table 1. In addition, evaluation lithium-ion secondary batteries of Examples 13 to 15 were prepared as in Example 1 using the obtained negative electrodes.

Examples 16 to 17

Negative electrodes of Examples 16 and 17 were obtained as in Example 1 except that the negative electrode active material and the positive electrode active material were applied so that the application amount of the negative electrode active material was 2.2 mg/cm$^2$, and the application amount of the positive electrode active material was 13.6 mg/cm$^2$, a pressed copper foil having a thickness of 16 μm was used as a negative electrode current collector, and pressing process conditions were respectively changed as shown in Table 1. In addition, evaluation lithium-ion secondary batteries of Examples 16 and 17 were prepared as in Example 1 using the obtained negative electrodes.

Comparative Examples 1 to 3

Negative electrodes of Comparative Examples 1 to 3 were obtained as in Example 1 except that the thickness of the negative electrode current collector and pressing process conditions were changed as shown in Table 1. In addition, evaluation lithium-ion secondary batteries of Comparative Examples 1 to 3 were prepared as in Example 1 using the obtained negative electrodes.

Comparative Example 4

A negative electrode of Comparative Example 4 was obtained as in Example 1 except that the negative electrode active material and the positive electrode active material were applied so that the application amount of the negative electrode active material was 8.25 mg/cm$^2$, and the application amount of the positive electrode active material was 51 mg/cm², and a copper foil having a thickness of 22 μm was used as a negative electrode current collector. In addition, an evaluation lithium-ion secondary battery of Comparative Example 4 was prepared as in Example 1 using the obtained negative electrode.

Comparative Example 5

A negative electrode of Comparative Example 5 was obtained as in Example 1 except that the negative electrode active material and the positive electrode active material were applied so that the application amount of the negative electrode active material was 1.5 mg/cm², and the application amount of the positive electrode active material was 10.2 mg/cm², a copper foil having a thickness of 40 was used as a negative electrode current collector, and a pressing process condition was changed to 5000 kg/cm. In addition, an evaluation lithium-ion secondary battery of Comparative Example 5 was prepared as in Example 1 using the obtained negative electrode.

Comparative Example 6

A negative electrode of Comparative Example 6 was obtained as in Example 1 except that a copper foil having a thickness of 7 μm was used as a negative electrode current collector. In addition, an evaluation lithium-ion secondary battery of Comparative Example 6 was prepared as in Example 1 using the obtained negative electrode.
Evaluation of Tensile Strength
The tensile strength of the used negative electrode current collectors and the prepared negative electrodes in Examples and Comparative Examples was evaluated. The results are shown in Table 1.
Measurement of Charging/Discharging Cycle Characteristic
The charging/discharging cycle characteristics of the evaluation lithium-ion secondary batteries prepared in Examples and Comparative Examples were evaluated. The results are shown in Table 1.
Measurement of Charging/Discharging Rate Performance
As the result of evaluating the charging/discharging rate performance of the evaluation lithium-ion secondary batteries prepared in Example 1 and Comparative Example 6, while the capacity retention (%) at 5.0 C in Example 1 was 58.1%, the capacity retention (%) at 5.0 C in Comparative Example 6 was 46.8%. This is because the thickness of the negative electrode current collector is decreased to increase resistance as the negative electrode current collector so that current collecting properties are lowered.
Measurement of Volumetric Energy Density
The volumetric energy density of the evaluation lithium-ion secondary batteries prepared in Examples and Comparative Examples were evaluated. However, the volume of the positive electrode, the negative electrode, and the separator was used as the volume of the lithium-ion secondary battery. The results are shown in Table 1. A case where the volumetric energy density was good was represented by "○", and a case where the volumetric energy density was low was represented by "X" in Table 1.
Negative Electrode Active Material Layer Exfoliation Evaluation
The presence of the exfoliation of the negative electrode active material layer in the evaluation lithium-ion secondary batteries prepared in Examples and Comparative Examples was evaluated. After the cycle test, the batteries were decomposed and the presence of the exfoliation of the negative electrode active material layer was visually evaluated. The results are shown in Table 1. A case where the negative electrode active material layer was not exfoliated was represented by "○" and a case where the negative electrode was exfoliated was represented by "X" in Table 1.

In Comparative Example 1 and Comparative Example 4, it is assumed that cycle deterioration is caused since the negative electrode current collector cannot follow the expansion of the negative electrode active material layer to be fractured, and the exfoliation of the negative electrode active material layer occurs.

In Comparative Example 2 and Comparative Example 3, it is assumed that a large amount of interface stress is generated between the negative electrode current collector and negative electrode active material layer since the tensile strength of the negative electrode current collector is large and thus, deformation is difficult to occur.

In Comparative Example 5, while the product of the tensile strength and the thickness of the negative electrode was more than 9.0 N/mm, and the value obtained by dividing the product of the tensile strength and the thickness of the negative electrode by the product of the tensile strength and the thickness of the negative electrode current collector was less than 1.06, the cycle characteristic was good. However, since a ratio of the active material in the electrode volume was low in the electrode configuration, it was difficult to obtain the lithium-ion secondary battery with a high capacity.

TABLE 1

|  | Current collector thickness (μm) | Negative electrode thickness (μm) | Line pressure (kgf/cm) | Current collector tensile strength (N/mm2) | Product of tensile strength and thickness of current collector (N/mm) | Tensile strength of negative electrode (N/mm2) |
|---|---|---|---|---|---|---|
| Example 1 | 10 | 67 | 2000 | 314 | 3.1 | 59 |
| Example 2 | 10 | 68 | 1500 | 301 | 3.0 | 56 |
| Example 3 | 10 | 68 | 1000 | 298 | 3.0 | 56 |
| Example 4 | 10 | 69 | 500 | 294 | 2.9 | 55 |
| Example 5 | 26 | 62 | 5000 | 325 | 8.5 | 145 |
| Example 6 | 26 | 63 | 3000 | 321 | 8.3 | 142 |
| Example 7 | 26 | 63 | 2000 | 316 | 8.2 | 140 |
| Example 8 | 26 | 64 | 1000 | 298 | 7.7 | 131 |
| Example 9 | 26 | 66 | 300 | 287 | 7.5 | 122 |
| Example 10 | 10 | 67 | 2000 | 429 | 4.3 | 78 |
| Example 11 | 10 | 68 | 1000 | 425 | 4.3 | 76 |
| Example 12 | 10 | 69 | 500 | 412 | 4.1 | 73 |
| Example 13 | 12 | 49 | 5000 | 441 | 5.3 | 121 |
| Example 14 | 12 | 50 | 1500 | 428 | 5.1 | 115 |
| Example 15 | 12 | 51 | 500 | 418 | 5.0 | 111 |

TABLE 1-continued

| | | | | | | |
|---|---|---|---|---|---|---|
| Example 16 | 16 | 54 | 1000 | 259 | 4.1 | 88 |
| Example 17 | 16 | 55 | 500 | 237 | 3.8 | 80 |
| Comparative Example 1 | 10 | 71 | 300 | 281 | 2.8 | 52 |
| Comparative Example 2 | 26 | 62 | 6500 | 329 | 8.6 | 144 |
| Comparative Example 3 | 26 | 83 | 2000 | 319 | 8.3 | 111 |
| Comparative Example 4 | 22 | 165 | 1000 | 307 | 6.8 | 55 |
| Comparative Example 5 | 40 | 66 | 5000 | 331 | 13.2 | 206 |

| | Product of tensile strength and thickness of negative electrode (N/mm) | Product of tensile strength and thickness of negative electrode/ Product of tensile strength and thickness of current collector Tensile strength and thickness of electrode | Capacity retention at 500 cycles (%) | Volumetric energy density | Exfoliation of negative electrode active material layer |
|---|---|---|---|---|---|
| Example 1 | 4.0 | 1.26 | 54.4 | ○ | ○ |
| Example 2 | 3.8 | 1.27 | 54.1 | ○ | ○ |
| Example 3 | 3.8 | 1.28 | 53.8 | ○ | ○ |
| Example 4 | 3.8 | 1.29 | 52.9 | ○ | ○ |
| Example 5 | 9.0 | 1.06 | 50.6 | ○ | ○ |
| Example 6 | 8.9 | 1.07 | 51.8 | ○ | ○ |
| Example 7 | 8.8 | 1.07 | 52.4 | ○ | ○ |
| Example 8 | 8.4 | 1.08 | 54.8 | ○ | ○ |
| Example 9 | 8.1 | 1.08 | 57.9 | ○ | ○ |
| Example 10 | 5.2 | 1.22 | 54.9 | ○ | ○ |
| Example 11 | 5.2 | 1.22 | 55.8 | ○ | ○ |
| Example 12 | 5.0 | 1.22 | 56.7 | ○ | ○ |
| Example 13 | 5.9 | 1.12 | 56.6 | ○ | ○ |
| Example 14 | 5.8 | 1.12 | 57.4 | ○ | ○ |
| Example 15 | 5.7 | 1.13 | 58.8 | ○ | ○ |
| Example 16 | 4.7 | 1.14 | 60 | ○ | ○ |
| Example 17 | 4.4 | 1.16 | 58 | ○ | ○ |
| Comparative Example 1 | 3.7 | 1.31 | 44.4 | ○ | x |
| Comparative Example 2 | 8.9 | 1.04 | 43.1 | ○ | x |
| Comparative Example 3 | 9.2 | 1.11 | 33.9 | ○ | x |
| Comparative Example 4 | 9.1 | 1.34 | 30.5 | ○ | x |
| Comparative Example 5 | 13.6 | 1.03 | 53.3 | x | ○ |

The present invention can provide the lithium-ion secondary battery with an excellent charging/discharging cycle characteristic.

What is claimed is:

1. A negative electrode for lithium-ion secondary battery, comprising:
   a negative electrode current collector having a tensile strength and a thickness, the tensile strength of the negative electrode current collector being 237 N/mm² or more and 441 N/mm² or less; and
   a negative electrode active material layer formed on the negative electrode current collector,
   the negative electrode having a tensile strength and a thickness;
   the negative electrode active material layer containing (1) silicon and silicon oxide as main components and (2) a binder and a conductive auxiliary agent;
   a product of the tensile strength and thickness of the negative electrode being 3.8 to 9.0 N/mm; and
   a value obtained by dividing the product of the tensile strength and the thickness of the negative electrode by a product of the tensile strength and thickness of the negative electrode current collector being 1.06 to 1.29.

2. A lithium-ion secondary battery using the negative electrode according to claim 1.

* * * * *